L. HADFIELD.
TRAFFIC SIGNAL.
APPLICATION FILED APR. 1, 1919.
1,371,368.
Patented Mar. 15, 1921.
2 SHEETS—SHEET 1.
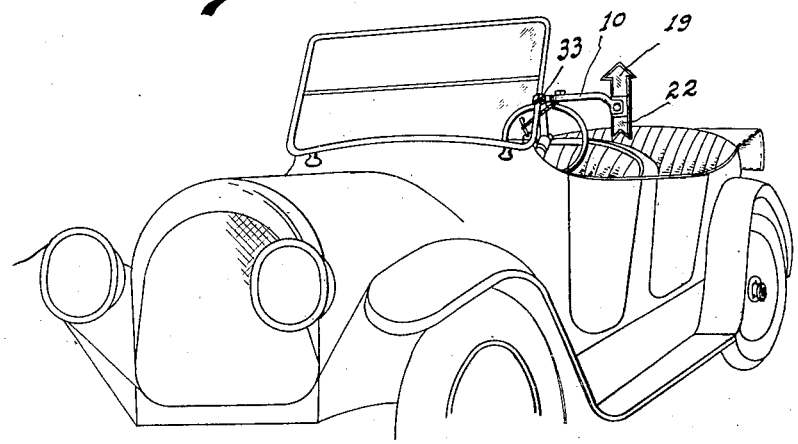
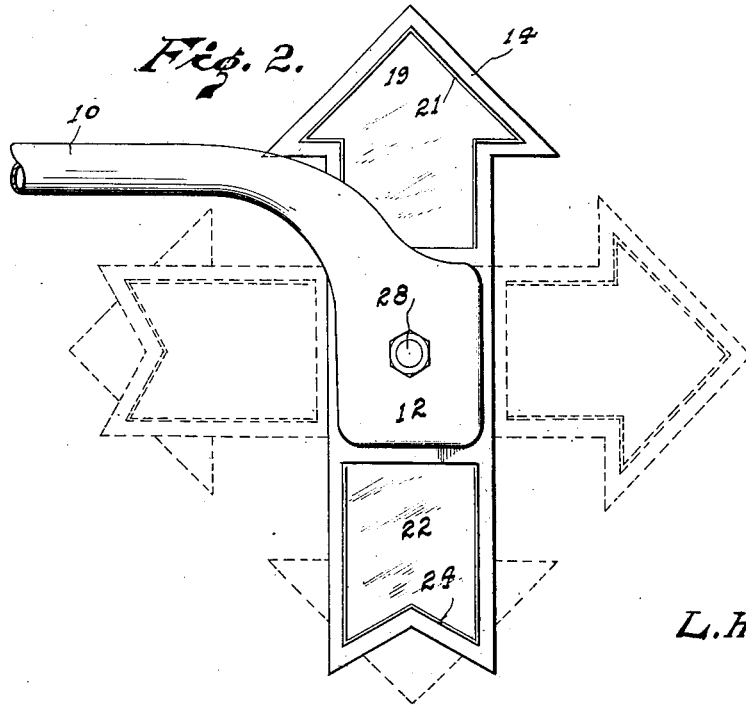
Inventor
L. Hadfield
By
Lacey & Lacey, Attorneys

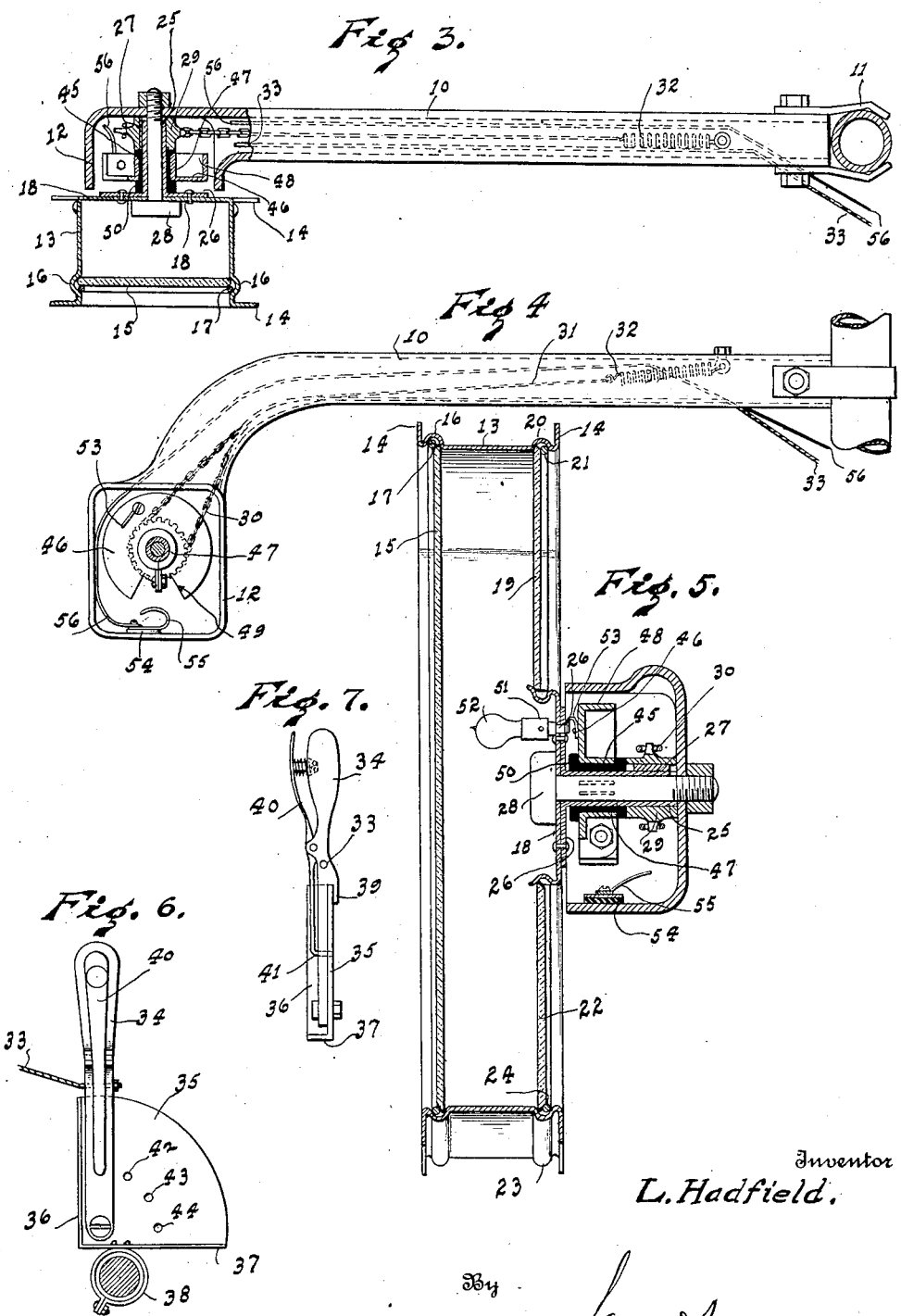

UNITED STATES PATENT OFFICE.

LEO HADFIELD, OF CAIRO, ILLINOIS.

TRAFFIC-SIGNAL.

1,371,368.  Specification of Letters Patent.  Patented Mar. 15, 1921.

Application filed April 1, 1919. Serial No. 286,684.

*To all whom it may concern:*

Be it known that I, LEO HADFIELD, citizen of the United States, residing at Cairo, in the county of Alexander and State of Illinois, have invented certain new and useful Improvements in Traffic-Signals, of which the following is a specification.

This invention relates to an improved direction signal for motor vehicles and has as its primary object to provide a device of this character whereby a driver may readily signal an intention to turn either to the right or left, to proceed slowly, or to stop.

The invention has as a further object to provide a signal employing a signaling device of such nature that traffic approaching the signal from either the front or rear may readily observe the signal.

A further object of the invention is to provide a signal wherein, at night, the signaling device may be illuminated so that the signal may prove thoroughly effective both during the day time and at night.

And the invention has as a still further object to provide a signal which may be readily connected to substantially any conventional type of motor vehicle and which may be operated with ease from the driver's seat.

Other and incidental objects will appear hereinafter. In the drawings:

Figure 1 is a perspective view showing my improved device connected to a conventional type of motor vehicle.

Fig. 2 is a front elevation of the signaling device, this view showing in dotted lines the different signaling positions of the signaling device, Fig. 3 is a plan view, the signaling device being shown in section as is also the outer end portion of the bracket arm employed, Fig. 4 is a front elevation, the signaling device being removed, Fig. 5 is a vertical sectional view more particularly illustrating the construction of the signaling device and its mounting, Fig. 6 is a view illustrating the actuating lever for the signaling device, and Fig. 7 is a view more particularly illustrating the mounting of said lever.

In carrying the invention into effect I employ a preferably tubular bracket arm 10 to the inner end of which are connected clamping members 11 by which the device may, as shown in Fig. 1, be connected to an automobile wind shield. In Fig. 1 I have shown the device in place upon the wind shield of a conventional type of motor vehicle. Adjacent its outer end, the arm 10 is bent laterally downward and terminates in a substantially rectangular housing 12 which is open at its rear side. Closing this side of the housing is the signaling device employed. This signaling device is, as particularly shown in Figs. 1 and 2 of the drawings, of the general shape of an arrow, being formed with a pointed head portion and an indented tip. The signaling device includes a preferably sheet metal casing 13 at the front and rear sides of which are formed marginal flanges 14 conforming in contour to the contour of the casing. These flanges are preferably painted or otherwise coated white so that, in the day time, the white outline of an arrow will be seen both at the front and rear of the casing. Closing the outer side of the casing is a glass pane 15 which is preferably colored red and, at its edges is received within a suitable channel 16 formed in the casing wall. Bearing against the margin of the pane and engaging within said channel is a clamping member 17 removably securing the pane in position. The clamping member 17 is preferably formed from a single length of suitable resilient wire bent into proper shape. At its inner side, the casing is formed with a reduced inner side wall 18. Closing the inner side of the casing above this wall is a glass pane 19 engaged at its edges in a channel 20 formed in the body wall of the casing and in a transverse flange at the upper margin of the wall 18. Engaging within said channel to coact with the margin of the pane is a clamping member 21 removably securing the pane in position. This clamping member, like the clamping member 17, is preferably formed from a suitable length of resilient wire bent into proper shape. Closing the inner side of the casing below the wall 18 is a glass pane 22. This pane is engaged within a suitable channel 23 formed in the body wall of the casing and in a flange at the lower margin of the wall 18. Removably securing this pane in position is a clamping member 24 engaging within the channel and binding against the margins of the pane. The clamping member 24 is similar to the clamping members 17 and 21. Also, it should be noted that the glass panes 19 and 22 are preferably colored red like the pane 15.

Mounted upon the wall 18 of the casing is a rearwardly projecting sleeve 25 provided at its inner end with a radial flange 26 riveted or otherwise secured to said wall. At its outer end, the sleeve is formed with a key 27. Fitting through said sleeve as well as through the inner side wall 18 of the casing is a bolt 28 which engages through the rear wall of the housing 12 and receives a suitable nut connecting the bolt with the housing so that the sleeve may thus turn upon the bolt for rotatably supporting the signaling device. Fitted over the inner end of the sleeve and connected therewith by the key 27, is a sprocket 29. Engaging around this sprocket, is a sprocket chain 30 to one end of which is connected a cable 31 extending within the bracket arm 10. This cable is secured to one end of a spring 32, the opposite end of which is held by a suitable eye bolt engaged through the arm. Connected to the opposite end of the chain 30 is an operating cable 33 which is carried through a suitable opening adjacent the inner end of the bracket arm and is connected to an operating lever 34. The lever 34 is swingingly connected at its inner end to a segmental supporting plate 35 the straight edges of which are provided with flanges 36 and 37 respectively. A clamping band 38 is riveted or otherwise secured to the latter flange, and as particularly shown in Fig. 1, this band engages around the steering column of the vehicle for conveniently supporting the lever 34 immediately beneath the steering wheel. At one side the lever is formed with a keeper 39 engaging over the curved edge of the plate 35 and pivoted upon the lever at its opposite side is a spring pressed latch 40 provided at its inner end with a laterally directed terminal 41 freely received through the lever and adapted to engage in a series of openings in the plate 35. In the normal position of the lever abutting the flange 36 of the plate 35, as shown in Fig. 6, the latch terminal is engaged through one of said openings. For convenience, the other of said openings have been indicated at 42, 43 and 44.

As will now be clear, the signaling device will, under ordinary conditions, be held in its normal vertical position by the spring 32. However, by grasping the lever 34 and releasing the latch 40, this lever may be swung to rotate the signaling device in a clockwise direction to first signaling position. As shown in dotted lines in Fig. 2, the terminal 41 of the latch is engaged in the opening 42 of the plate 35 for holding the signaling device in such position. The signaling device will then point to the right for indicating an intention of the driver to turn accordingly. By further swinging the lever upon its pivot, the terminal 41 of the latch 40 may be engaged in the opening 43 in the plate 35 when the signaling device will be swung to second signaling position. In this position of the signaling device, said device will, as also shown in dotted lines in Fig. 2, point downwardly for indicating an intention of the driver either to proceed slowly or to stop. By further swinging the lever 34, the terminal 41 of the latch may be engaged in the opening 44 of the plate 35 when the signaling device will be rotated to third signaling position. As further shown by dotted lines in Fig. 2, the signaling device would then point to the left for indicating an intention of the driver to turn accordingly. My improved signal may, therefore, be easily actuated from the driver's seat for giving a signal of an intention to turn either to the right or left, to proceed slowly, or to stop, and owing to the white color bands upon the flanges 14 of the signal casing the signaling device will be readily visible. Further, it is to be noted that the signal may be observed by traffic approaching the signal either from the front or rear. Upon the release of the latch 40, after the signaling device has been moved to any one of its signaling positions, the spring 32 will then act to immediately return the signaling device to its normal vertical position pointing upward.

Surrounding the sleeve 25 is a split sleeve 45 of insulating material provided at one end with a suitable flange abutting the sprocket 29. Mounted upon the sleeve 45 is a movable annular contact member 46. This contact member is provided with a central hub or flange 47 clamped, as shown in Fig. 4, about the sleeve 45 so that the sleeve as well as said member is fixed to the sleeve 25 to turn therewith. At its periphery, the contact member is provided with an annular flange 48 and opening through this flange is a notch 49 formed in the contact member at one side thereof so that the continuity of the flange is thus broken. Bearing between the contact member and the flange 26 of the sleeve 25 is a collar 50 which is also of insulating material. Mounted within the signaling device and suitably secured to the wall 18 of the casing thereof is an electric lamp socket 51. This socket may be of any approved design and removably receives an electric lamp 52. Electrically connecting the socket 51 with the contact member 46 is a wire 53 which may be secured to said member by a screw or other suitable fastening device. Mounted upon the bottom wall of the housing 12 is a block 54 of insulating material and connected to this block is a fixed spring contact member 55, the free end portion of which is rebent, as shown in Fig. 4, to project into the path of the flange 48 of the movable contact member 46. Leading from the contact member 55 is a wire 56 which is carried through the housing 12, through the arm 10, and out through the opening adjacent the inner end of said arm. This wire may be connected to a storage battery or other suitable source of electrical energy upon the vehicle and preferably the flow of current through the wire will be controlled by a suitably located hand operated switch. This switch will, of course, provide a means whereby the circuit through the wire may, in the day time, be broken. However, since the switch forms no part of the present invention, it has not been shown.

At night, the switch controlling flow of current through the wire 56 is closed. However, it is to be observed that when the signaling device is standing in normal vertical position, as previously described, the free end of the contact member 55 is received within the notch 49 of the movable contact member 48. Consequently, the circuit to the lamp 52 will be normally broken.

On the other hand, rotation of the signaling device to any one of its signaling positions, as also previously described, will coincidentally rotate the contact member 46 so that the flange 48 of said member will be shifted into engagement with the contact member 55. Current will then flow through the wire 56, the contact member 55, thence through the flange 48 of the contact member 46 and through this latter member and the wire 53 to the lamp, the lamp socket 51 being grounded to the casing 13 of the signaling device. Accordingly, as long as the signaling device is moved for giving any of the different signals, the lamp 52 will be energized so that a red colored light will be emitted through the red colored panes 15, 19 and 22 at opposite sides of the signaling device. Thus, the position of the signaling device may be ascertained both from the front and rear of the vehicle. When the signaling device is then again shifted to its normal position, flow of current to the lamp 52 will again be broken at the contact member 55 for extinguishing the lamp. I accordingly provide a signal which will be found equally as effective at night as in the day time.

Having thus described the invention, what is claimed as new is:

1. A traffic signal including a bracket arm provided with a housing having an open front side, a signaling device extending over said open front side of the housing, means extending through the housing and rotatably connecting the signaling device with the arm, a sprocket located within the housing and connected with the signaling device, yieldable means associated with said sprocket for normally holding the signaling device in inactive position, and means for turning the sprocket in opposition to said yieldable means and rotating the signaling device to any one of a number of different signaling positions.

2. A traffic signal including a signaling device, a sleeve extending therefrom, a bracket arm, a fastening device extending through said sleeve and rotatably connecting the signaling device with the bracket arm, yieldable means normally holding the signaling device in inactive position, and means for rotating the signaling device in opposition to said yieldable means to any one of a number of different signaling positions.

3. A traffic signal including a signaling device, a sleeve extending therefrom, a bracket arm, a fastening device extending through said sleeve and rotatably connecting the signaling device with the bracket arm, a sprocket mounted upon said sleeve, yieldable means associated with said sprocket and normally holding the signaling device in inactive position, and manually operable means coacting with the sprocket in opposition to said yieldable means for rotating the signaling device to any one of a number of different signaling positions.

In testimony whereof I affix my signature.

LEO HADFIELD. [L. S.]